United States Patent
Tanaka et al.

(10) Patent No.: US 6,217,100 B1
(45) Date of Patent: Apr. 17, 2001

(54) WINDSHIELD UNIT FOR A MOTOR VEHICLE

(75) Inventors: Koichi Tanaka; Takanori Ishii, both of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/456,536

(22) Filed: Dec. 8, 1999

(30) Foreign Application Priority Data

Dec. 8, 1998 (JP) .................................................. 10-366087

(51) Int. Cl.⁷ ................................. B62J 17/00; B60J 1/00; B60J 1/20; B60J 1/08; B62D 61/02
(52) U.S. Cl. ........................................ 296/78.1; 296/180.1
(58) Field of Search .............................. 296/78.1, 180.1; 296/180.5; 180/229, 68.1

(56) References Cited

U.S. PATENT DOCUMENTS

| | | | | |
|---|---|---|---|---|
| 3,971,452 | * | 7/1976 | Morelli ............................... | 180/1 FV |
| 4,157,739 | * | 6/1979 | Frye ..................................... | 296/78.1 |
| 4,461,508 | * | 7/1984 | Ogishima ............................ | 296/78.1 |
| 4,473,251 | * | 9/1984 | Murayama .......................... | 296/78.1 |
| 4,536,005 | * | 8/1985 | Tanaka et al. ...................... | 296/78.1 |
| 4,537,273 | * | 8/1985 | Funabashi .......................... | 180/229 |
| 4,615,566 | * | 10/1986 | Stahel ................................. | 296/78.1 |
| 4,650,204 | * | 3/1987 | Bothwell ............................. | 296/78.1 |
| 4,799,568 | * | 1/1989 | Tanaka ............................... | 180/229 |
| 4,830,135 | * | 5/1989 | Yamashita .......................... | 180/229 |
| 4,840,418 | * | 6/1989 | Bockenheuser .................... | 296/78.1 |
| 5,107,949 | * | 4/1992 | Gotoh et al. ....................... | 180/219 |
| 5,222,752 | * | 6/1993 | Hewitt ................................ | 296/78.1 |
| 5,275,067 | * | 1/1994 | Lew .................................... | 296/78.1 |
| 5,330,029 | * | 7/1994 | Yoshimura et al. ................ | 180/219 |
| 5,857,727 | * | 1/1999 | Vetter ................................. | 296/78.1 |
| 5,911,466 | * | 6/1999 | Hoshi et al. ....................... | 296/180.1 |
| 5,979,966 | * | 11/1999 | Suzuki ............................... | 296/78.1 |
| 6,042,171 | * | 3/2000 | Hesse ................................. | 296/78.1 |

FOREIGN PATENT DOCUMENTS

| | | | | |
|---|---|---|---|---|
| 1086746 | * | 11/1953 | (FR) | ............................... 296/78.1 |
| 0053681 | * | 2/1990 | (JP) | ............................... 296/78.1 |
| Y2-3 26063 | | 6/1991 | (JP) | . |
| 405170158 | * | 7/1993 | (JP) | ............................... 296/78.1 |

* cited by examiner

*Primary Examiner*—D. Glenn Dayoan
*Assistant Examiner*—Hilary Gutman

(57) ABSTRACT

A windshield unit having side visors capable of performing multiple functions. The side visors are attached to a lower portion of a front cowl. The side visors are formed by transparent plate members and each have a slant portion which is inclined so that a lower side portion of the slant portion projects forwardly of a vehicle. Apertures are formed in an upper portion of the side visors, so that a part of the running wind passes through the apertures, reducing the running resistance of the vehicle. Another part of the running wind generates a down-force on the vehicle due to the action of the slant portions.

20 Claims, 6 Drawing Sheets

WINDSHIELD UNIT FOR A MOTOR VEHICLE

BACKGROUND OF THE INVENTION

1. Field of the Invention

The present invention relates to a windshield unit for a motor vehicle.

2. Background Art

An example of a conventional windshield unit for a two-wheeled motor vehicle is disclosed in Japanese Utility Model Publication No. Hei3-26063. In this publication, a steering handle bar of the vehicle is covered from the front side with a front cover, and side visors for shielding wind are mounted along leg shield edges. The side visors each have a backwardly projecting edge portion to conduct running wind backward. Part of the front cover also serves as a front cowl.

The conventional side visors are used only for the purpose of shielding a rear passenger from wind.

It would therefore be desirable for the side visors to fulfill multiple functions.

SUMMARY OF THE INVENTION

An object of the present invention is to provide a windshield unit which, not only shields a passenger from wind, but which also provides a down-force on the vehicle to help maintain the vehicle's running posture.

Another object of the present invention is to provide a windshield unit which allows for reduced running resistance from wind.

The present invention achieves the above objects and further advantages not contemplated by the conventional art.

An embodiment of the present invention includes a front cowl disposed ahead of a steering handle bar, and side visors disposed to the sides of the front cowl. The side visors are each provided with a slant portion which projects from the side of the vehicle generally downwardly, and towards the front of the vehicle.

The side visors may be equipped each with an aperture, and may be formed by a transparent plate member.

Because the side visors are each provided with a slant portion, when running wind strikes the side visors, it is directed downwardly by the slant portions. A down-force is consequently generated, which acts to press the vehicle body downward. Thus, the side visors not only serve as wind shielding members, but also aid in maintaining the vehicle running posture.

Because the side visors each have an aperture, a part of the running wind flows backwardly through the apertures of the side visors. It is therefore possible to reduce vehicle running resistance. The area of each aperture can be set to a desired value to achieve a desired wind shielding effect, a resulting down-force, and a running resistance to be reduced.

Because the side visors are each formed by a transparent plate member, the side visors have a desirable appearance.

Further scope of applicability of the present invention will become apparent from the detailed description given hereinafter. However, it should be understood that the detailed description and specific examples, while indicating preferred embodiments of invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
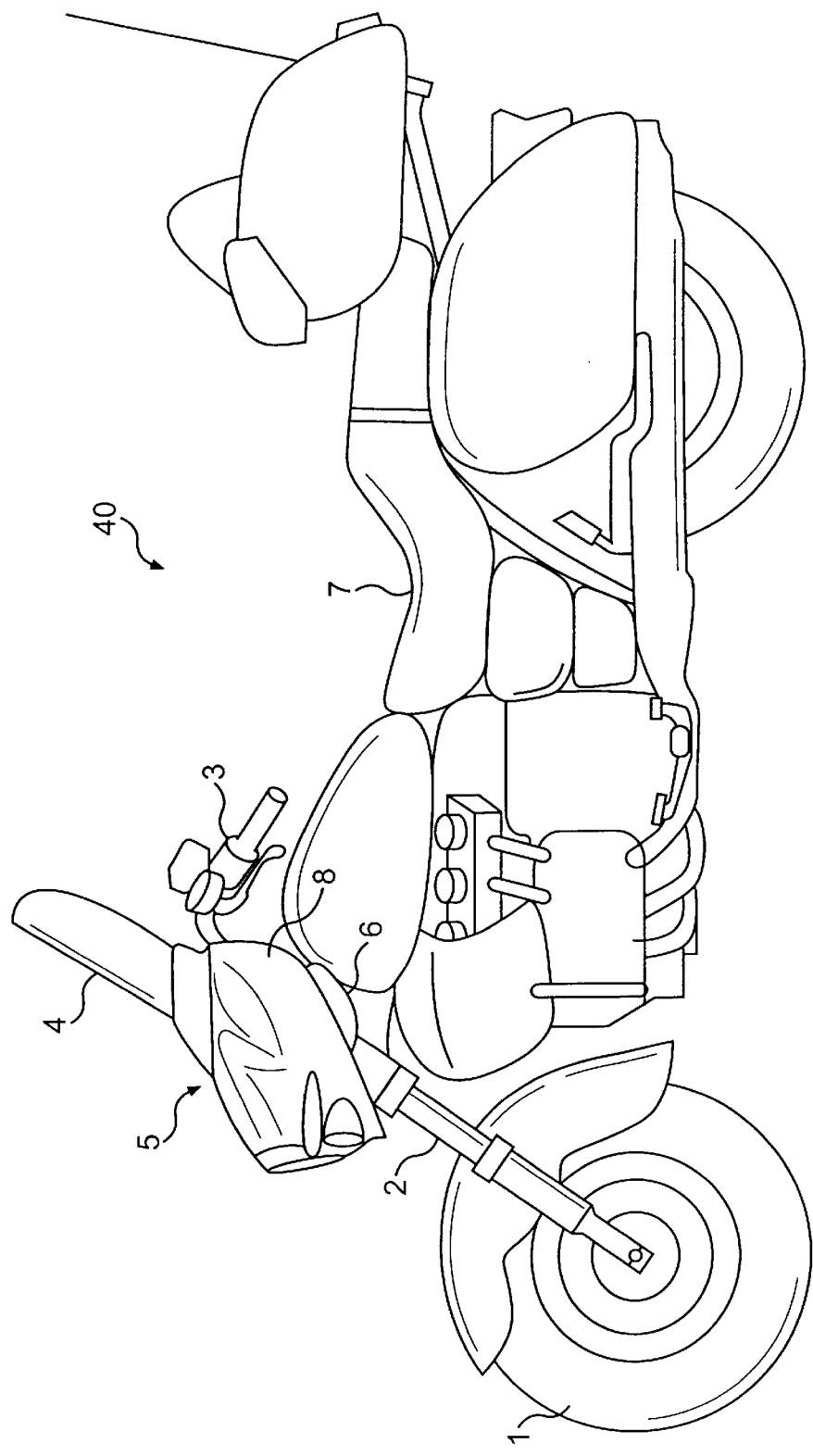
FIG. 1 is a side view of a two-wheeled motor having a windshield unit according to the present invention.

With reference to the drawing figures, the term "forwardly" is used to generally describe a direction from the rear wheel of the vehicle towards the front wheel of the vehicle, and "rearwardly" and "backwardly" a direction from the front wheel towards the rear wheel.

As shown in FIG. 1, a front fork 2 supports a front wheel 1 provided at a front portion of a two-wheeled motor vehicle 40. A steering handle bar 3 is connected to the top of the front fork 2, and reference numeral 7 denotes a seat. The handle bar 3 is covered from the front side with a front cowl 5 integral with a transparent windshield 4. On both right and left sides of the front cowl 5 are provided side visors 6.

The front cowl 5 and the side visors 6 produce a wind shielding effect for a rear passenger, and the surface of the front cowl 5 is constituted by a smooth curved surface which provides a flow rectifying effect against running wind.

Figure 2:
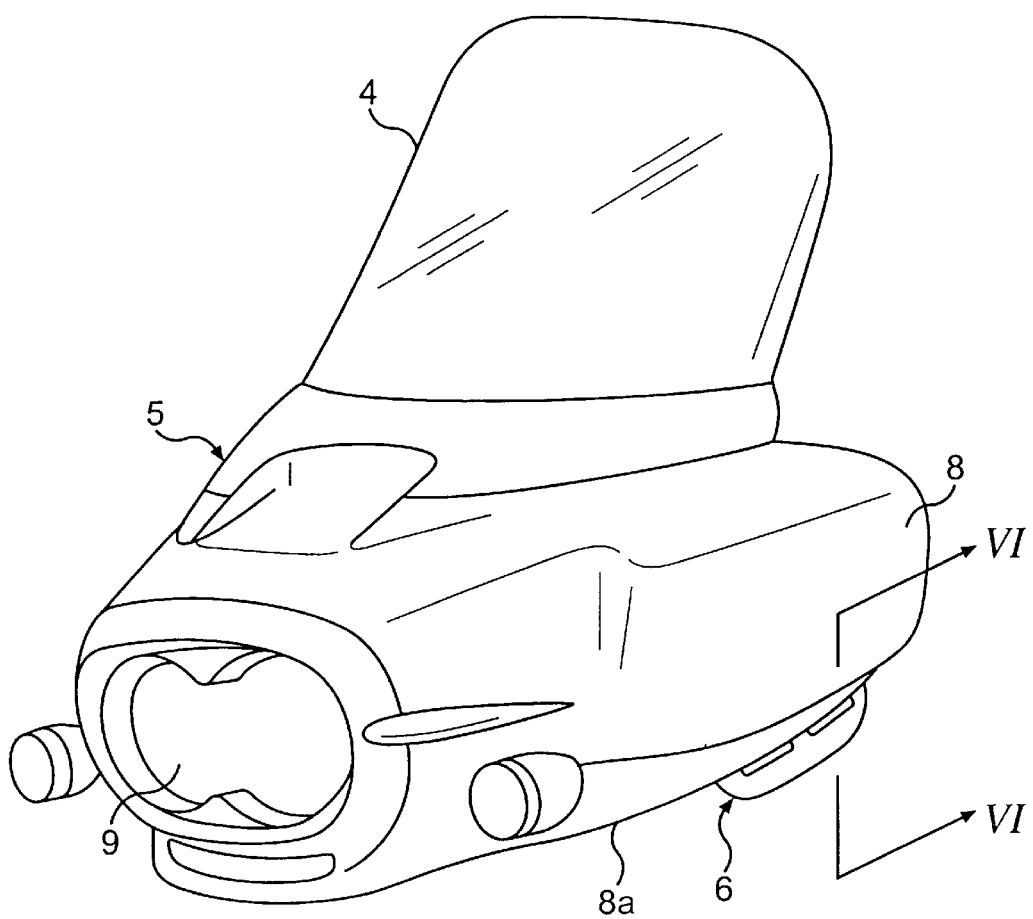
FIG. 2 is a perspective view of a windshield unit according to an embodiment of the present invention.
Figure 3:
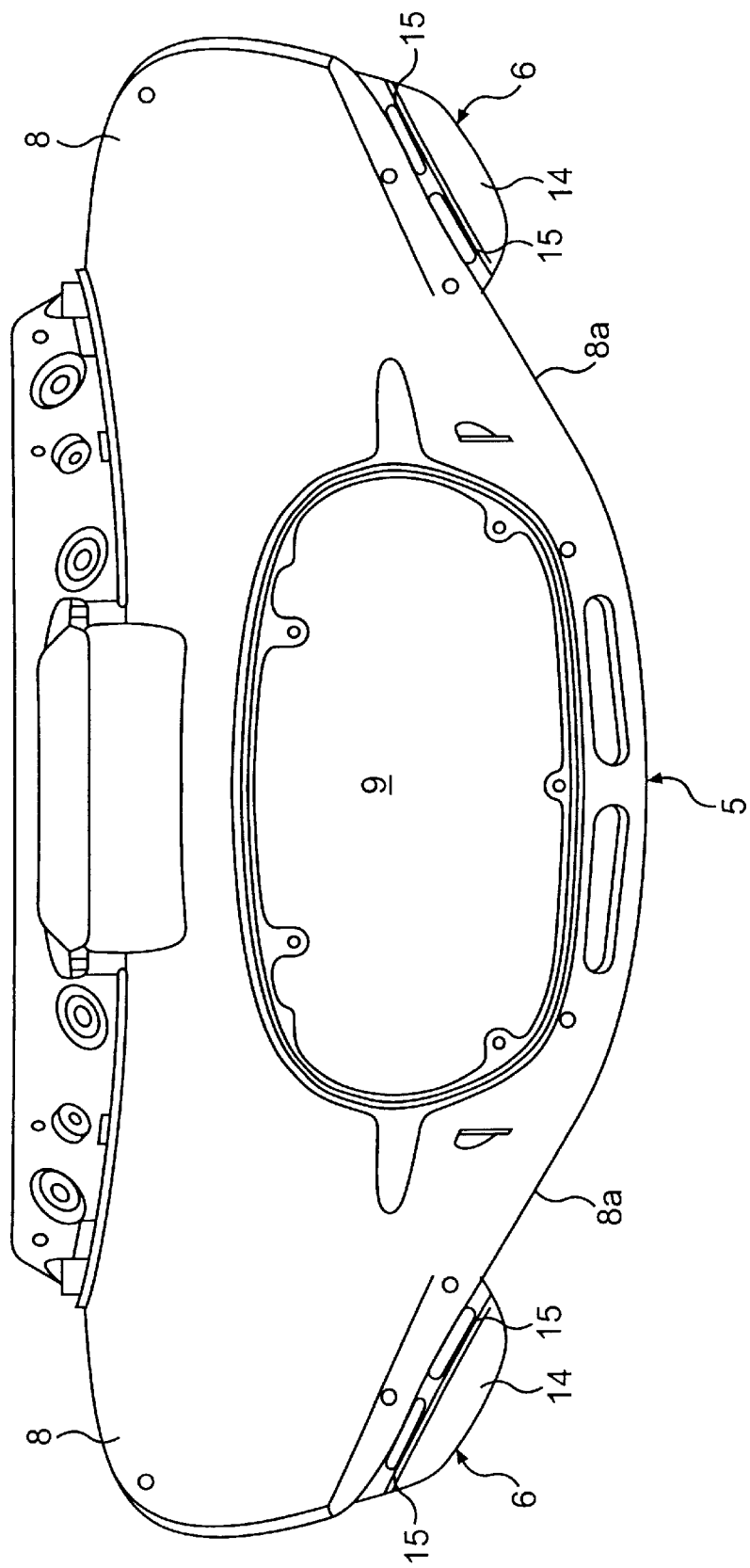
FIG. 3 is a front view of a windshield unit according to the present invention.
Figure 4:
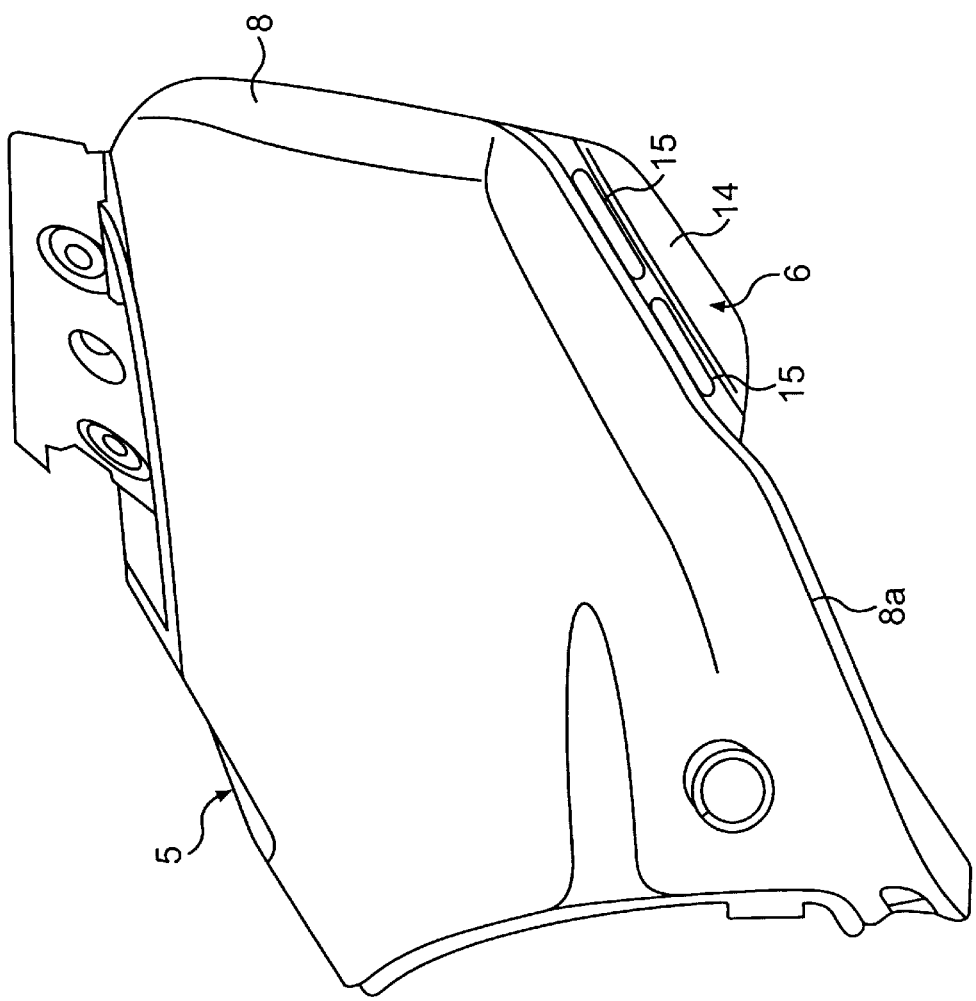
FIG. 4 is a side view of a windshield unit according to the present invention.

As shown in FIGS. 2 to 4, the front cowl 5 is provided with side portions 8 which extend backwardly while expanding outwardly from the vehicle. The side visors 6 are provided along lower ends 8a of the side portions 8. The lower ends 8a are inclined obliquely upward towards the side and rear (as shown in FIGS. 3 and 4). An aperture 9 for a headlight is formed in the front side of the front cowl 5.

Figure 5:
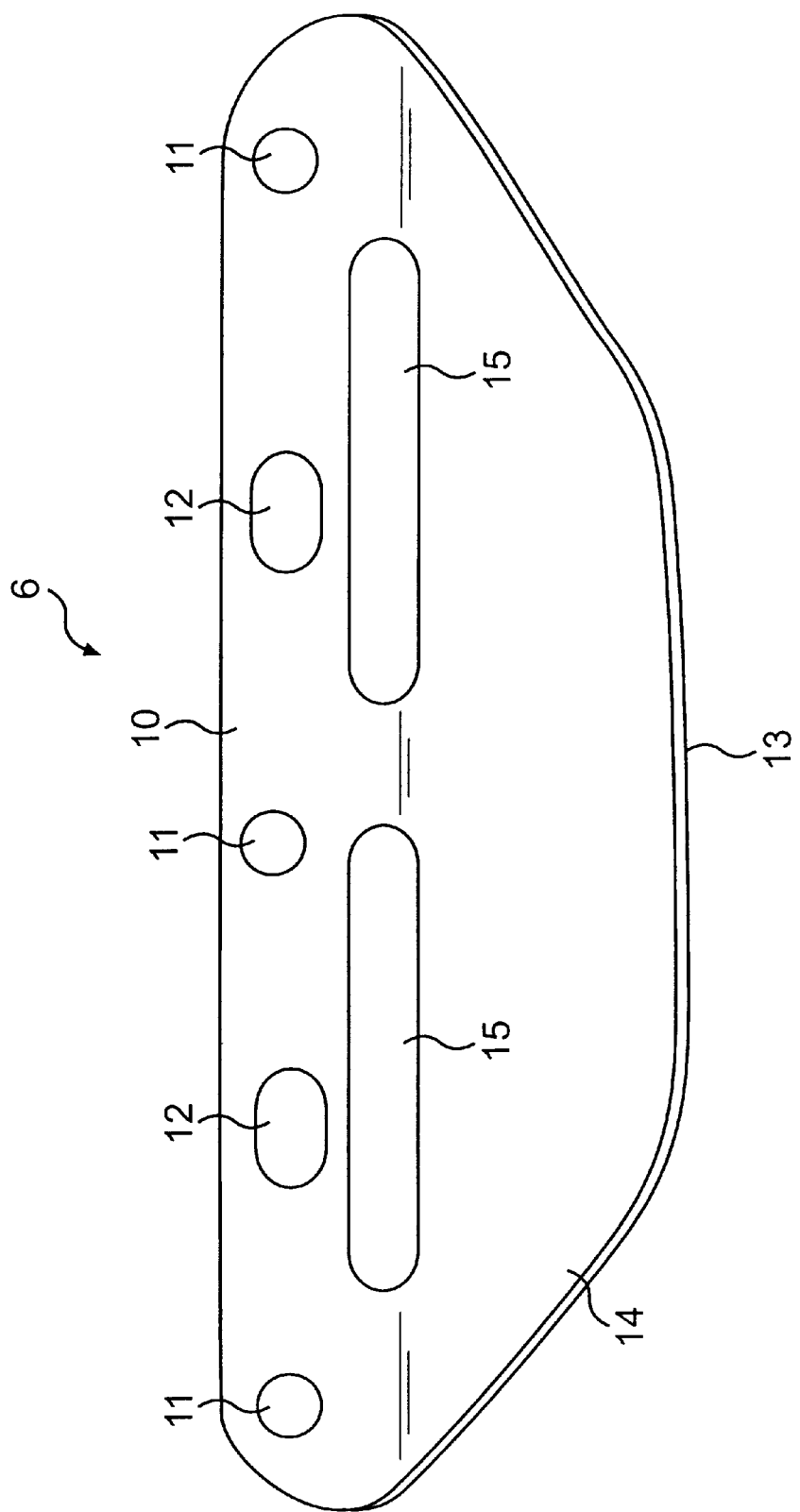
FIG. 5 is a plan view of a side visor according to an embodiment of the present invention.

As shown in FIG. 5, the side visors 6 are each formed by a transparent plate member which is substantially trapezoidal. The side visors may be formed by a suitable synthetic resin, such as a polycarbonate. An upper side portion 10 of each side visor 6 is a mounting edge portion extending along the back side of the lower end 8a at the associated side portion 8 of the front cowl 5. A plurality of mounting through holes 11 are formed along the upper side portion 10. Numeral 12 denotes a relief hole for mounting a component.

A lower side portion 13 is substantially parallel to and shorter than the upper side portion 10, and the portion between the lower side portion 13 and the upper side portion 10 forms a slant portion 14 which serves as a body portion of the side visor 6. In an area extending from the upper portion of the slant portion 14 to the upper side portion 10 there are formed wind-passing apertures 15 which are elongated in the longitudinal direction of the upper side portion 10.

The position, shape and area of each aperture 15 may be determined arbitrarily insofar as the intended wind shielding effect is ensured and in consideration of a balance between the magnitude of a down-force and that of the running resistance to be reduced.

Figure 6:
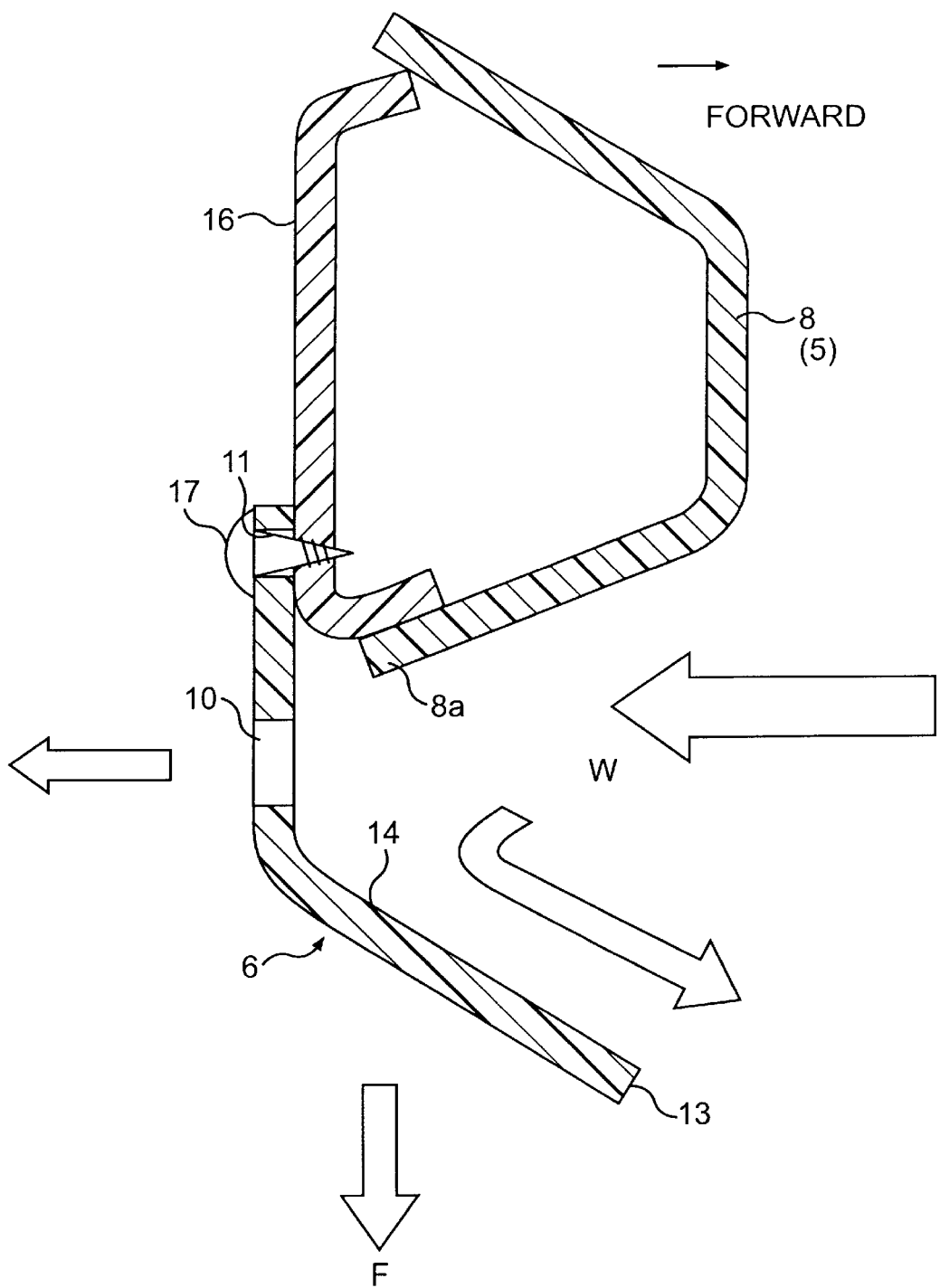
FIG. 6 is a schematic sectional view of a windshield unit according to an embodiment of the present invention.

The side visors 6 are each longitudinally curved along the lower end 8a of the associated side portion 8 of the front cowl 5, while in the vertical direction the slant portion 14 is inclined so that the lower side portion 13 projects generally forwardly and downwardly from the vehicle body, as shown in FIG. 6. As shown by FIG. 4, the side visors 6 also extend along a longitudinal extent of the vehicle body, so that the side visors 6 are oblique to both a longitudinal and a transverse axis of the vehicle body.

With the side visor attached to the front cowl 5, the upper side portion 10 is substantially parallel to the vertical direction and the apertures 15 are formed in the lower portion of the upper side portion 10, and partially in the upper portion of the slant portion 14.

FIG. 6 is a schematic sectional view of a windshield unit having a side visor 6. Reference numeral 16 denotes a back cover attached to the back side of each side portion 8. The upper side portion 10 of each side visor 6 is superimposed on the back of a lower portion of the back cover 16, and is fixed thereto by threaded engagement of screws 17 with the through holes 11. The back cover is attached to each side portion 8 by threaded engagement of screws (not shown) with the relief holes 12.

The operation of this embodiment will now be described. When running wind W strikes against the side visors 6, a part of the wind flows obliquely backward in the longitudinal direction of the side visors 6, another part thereof passes through the apertures 15 and flows backwardly, and the remaining part is conducted to the slant portions 14 and flows downwardly, thereby a down-force F is exerted on the side visors 6.

The down-force F is transmitted from the side visors 6 to the front side of the vehicle body through the front cowl 5, so that the side visors 6 serve not only as wind shielding members, but also as an aid in controlling the running posture of the vehicle body.

Also, because the apertures 15 are provided, when the down-force F is generated by the running wind W, giving rise to a running resistance, the running resistance can be reduced by allowing part of the running wind W to pass through the apertures 15.

Further, because the side visors 6 are each formed by a transparent plate member, it is possible to provide a windshield unit having a desirable appearance.

The present invention is not limited to the above embodiment, but various modifications may be made. For example, the shape of the side visors 6 may be changed as necessary depending upon the place where they are to be installed. The material for the side visors is not limited to a transparent resin material.

Further, the side visors 6 may be rendered integral with the front cowl. In this case, it is preferable that the slant portions be positioned near the center of the vehicle body. Because this position is opposite to the running wind, it is easiest to obtain the down-force effect.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A windshield unit for a vehicle having a handlebar, the windshield unit comprising:
    a front cowl, the front cowl being mountable forwardly of the handle bar; and
    at least one side visor mounted on at least one side of the front cowl, each of said at least one side visor having a slant portion which projects generally downwardly and forward with respect to the vehicle, and an upper portion which is at least in part disposed in a plane at an angle to the slant portion, wherein
    the slant portion has a free end extending along a length of the slant portion distal to the upper portion.

2. The windshield unit of claim 1, wherein the at least one side visor includes two side visors, a first side visor being mounted to a first side of the front cowl, and a second side visor being mounted to a second side of the front cowl.

3. The windshield unit of claim 2, wherein the upper portions are mounted to respective sides of the front cowl.

4. The windshield unit of claim 3, wherein the front cowl includes first and second side portions, the side portions extending towards the rear of the vehicle and outwardly from a longitudinal axis of the vehicle.

5. The windshield unit of claim 4, wherein the two side visors are mounted to lower ends of respective side portions.

6. The windshield unit of claim 4, wherein the front cowl includes a back cover, the back cover being connected to the first side portion and the second side portion.

7. The windshield unit of claim 6, wherein the upper portions of the first and second side visors are mounted to the back cover.

8. The windshield unit of claim 2, wherein each of said two side visors includes at least one aperture, the at least one aperture of each of said two side visors allowing wind to pass through the two side visors.

9. The windshield unit of claim 2, wherein each of said two side visors includes at least one through hole, the at least one through hole of each of said two side visors accommodating attachment members for attaching the two side visors to the front cowl.

10. The windshield unit of claim 2, wherein the two side visors are transparent.

11. The windshield unit of claim 2, wherein the two side visors are made from a synthetic resin.

12. The windshield unit of claim 11, wherein the two side visors are made from a polycarbonate.

13. The windshield unit of claim 1, wherein the front cowl includes a lower portion, the at least one side visor being mounted on said lower portion.

14. The windshield unit of claim 3, wherein each of said two side visors has a generally trapezoidal shape.

15. The windshield unit of claim 1, wherein
    the slant portion is substantially planar.

16. The windshield unit of claim 15, wherein the upper portion is wider than a lower portion thereof.

17. The windshield unit of claim 2, wherein the two side visors are elongate, each of said two side visors extending along a length dimension thereof, obliquely to both a longitudinal and a transverse axis of the vehicle, from a low point proximate a forward end of the vehicle to a higher point proximate a rear end of the vehicle.

18. The windshield unit of claim 17, wherein each of said two side visors extends outwardly from a center of the vehicle from said low point to said higher point.

19. The windshield unit of claim 18, wherein the upper portions and the slant portions are substantially planar.

20. The windshield unit of claim 19, wherein each of said two side visors includes at least one through hole, the at least one through hole of each of said two side visors accommodating attachment members for attaching the two side visors to the front cowl.

* * * * *